US012625304B2

(12) United States Patent (10) Patent No.: US 12,625,304 B2
Tsai et al. (45) Date of Patent: May 12, 2026

(54) OPTICAL LENS ASSEMBLY, IMAGING APPARATUS AND ELECTRONIC DEVICE

(71) Applicant: LARGAN PRECISION CO., LTD., Taichung City (TW)

(72) Inventors: Wen-Yu Tsai, Taichung City (TW); Chien-Pang Chang, Taichung City (TW); Chun-Hung Teng, Taichung City (TW); Kuo-Chiang Chu, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 672 days.

(21) Appl. No.: 17/737,102

(22) Filed: May 5, 2022

(65) Prior Publication Data

US 2022/0373724 A1 Nov. 24, 2022

Related U.S. Application Data

(60) Provisional application No. 63/191,364, filed on May 21, 2021.

(30) Foreign Application Priority Data

Apr. 6, 2022 (TW) .................................. 111113119

(51) Int. Cl.
*G02B 5/08* (2006.01)
*G02B 26/08* (2006.01)
*G03B 3/00* (2021.01)
(52) U.S. Cl.
CPC ....... *G02B 5/0875* (2013.01); *G02B 26/0816* (2013.01); *G03B 3/00* (2013.01)

(58) Field of Classification Search
CPC ..... G02B 5/0875; G02B 26/0816; G03B 3/00
See application file for complete search history.

(56) References Cited

U.S. PATENT DOCUMENTS

| | | |
|---|---|---|
| 6,934,085 B2 | 8/2005 | Stachowiak et al. |
| 9,348,117 B1 | 5/2016 | Chang et al. |

(Continued)

FOREIGN PATENT DOCUMENTS

| | | |
|---|---|---|
| CN | 216210000 U | 4/2022 |
| FR | 2658618 A1 | 8/1991 |

(Continued)

*Primary Examiner* — Balram T Parbadia
*Assistant Examiner* — Grant A Gagnon
(74) *Attorney, Agent, or Firm* — McClure, Qualey & Rodack, LLP

(57) ABSTRACT

According to the present disclosure, an optical lens assembly includes at least two optical lens elements and at least one reflective element. The reflective element is made of a plastic material, the reflective element includes a reflective coating membrane, and the reflective coating membrane is disposed on a surface of the reflective element. The reflective coating membrane includes at least three coating layers of different materials, the at least three coating layers are respectively made of a first material, a second material and a third material, the first material mainly includes silver, the second material mainly includes titanium, the third material mainly includes chromium oxides, and the coating layer made of the first material and the coating layer made of the second material are disposed between the coating layer made of the third material and the reflective element.

13 Claims, 7 Drawing Sheets

(56)         References Cited

U.S. PATENT DOCUMENTS

| 2002/0126265 | A1 | 9/2002 | Okura et al. |
| 2005/0083576 | A1 | 4/2005 | Stachowiak et al. |
| 2005/0195488 | A1 | 9/2005 | McCabe et al. |
| 2009/0148688 | A1 | 6/2009 | Sasaki et al. |
| 2010/0177380 | A1 | 7/2010 | Nagahama et al. |
| 2019/0317257 | A1 | 10/2019 | Chang et al. |
| 2022/0373715 | A1 | 11/2022 | Tsai et al. |

FOREIGN PATENT DOCUMENTS

| IN | 201624026032 | B | 11/2017 |
| JP | 2002079605 | A | 3/2002 |
| JP | 3162189 | U | 8/2010 |

OPTICAL LENS ASSEMBLY, IMAGING APPARATUS AND ELECTRONIC DEVICE

RELATED APPLICATIONS

This application claims priorities to U.S. Provisional Application Ser. No. 63/191,364, filed May 21, 2021, and Taiwan Application Serial Number 111113119, filed Apr. 6, 2022, which are herein incorporated by references.

BACKGROUND

Technical Field

The present disclosure relates to an optical lens assembly and an imaging apparatus. More particularly, the present disclosure relates to an optical lens assembly and an imaging apparatus applicable to electronic devices with high reflectivity.

Description of Related Art

The reflective coating membrane of the conventional reflective element is prone to problems, such as cracks or defects, due to the improper arrangement of coating layer materials or the environmental factors. Also, no matter in the visible light region or in the infrared region, the reflective efficiency of the reflective coating membrane is insufficient and the required reflectivity cannot be satisfied. Therefore, a technique of combining and arranging specific coating layers is needed to be developed to overcome the abovementioned problems.

SUMMARY

According to one aspect of the present disclosure, an optical lens assembly includes at least two optical lens elements and at least one reflective element. The reflective element is made of a plastic material, the reflective element includes a reflective coating membrane, and the reflective coating membrane is disposed on a surface of the reflective element. The reflective coating membrane includes at least three coating layers of different materials, the at least three coating layers are respectively made of a first material, a second material and a third material, the first material mainly includes silver, the second material mainly includes titanium, the third material mainly includes chromium oxides, and the coating layer made of the first material and the coating layer made of the second material are disposed between the coating layer made of the third material and the reflective element. When an average reflectance in a wavelength range of 800 nm-1000 nm of the reflective coating membrane is R80100, the following condition is satisfied: $97.5\% \leq R80100$.

According to another aspect of the present disclosure, an imaging apparatus includes the optical lens assembly of the aforementioned aspect and an image sensor. The image sensor is disposed on an image surface of the optical lens assembly.

According to one another aspect of the present disclosure, an electronic device, which is a mobile device, includes the imaging apparatus of the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
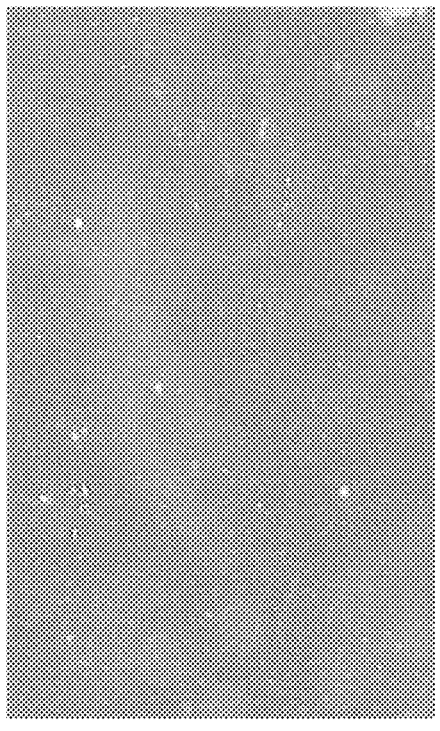
FIG. 1A is a surface quality image of the reflective element of the comparative embodiment.

According to one aspect of the present disclosure, an optical lens assembly includes at least two optical lens elements and at least one reflective element. The reflective element is made of a plastic material, the reflective element includes a reflective coating membrane, and the reflective coating membrane is disposed on a surface of the reflective element. The reflective coating membrane includes at least three coating layers of different materials, the at least three coating layers are respectively made of a first material, a second material and a third material, the first material mainly includes silver, the second material mainly includes titanium, the third material mainly includes chromium oxides, and the coating layer made of the first material and the coating layer made of the second material are disposed between the coating layer made of the third material and the reflective element.

Therefore, the reflective element of the optical lens assembly according to the present disclosure includes the combination of coating layers with high reflectivity and has the excellent ability for folding the light path by highly and effectively reflecting the light, which is favorable for preventing the reflective coating membrane from cracking.

When an average reflectance in a wavelength range of 800 nm-1000 nm of the reflective coating membrane is R80100, the following condition is satisfied: $95.0\% \leq R80100$. Therefore, the excellent reflectivity of near infrared can be obtained. Moreover, the following conditions can be satisfied: $95.5\% \leq R80100$; $96.0\% \leq R80100$; $96.5\% \leq R80100$; $97.0\% \leq R80100$; $97.5\% \leq R80100$; $98.0\% \leq R80100$; or $98.25\% \leq R80100$.

The coating layer made of the second material can be disposed between the coating layer made of the third material and the coating layer made of the first material. Therefore, the coating layer made of the first material can be effectively protected, so as to prevent oxidation and cracks of the coating layer.

The reflective coating membrane can further include a coating layer made of a fourth material. The fourth material mainly includes silicon compound. For example, the silicon compound can be silicon oxide, silicon nitride, etc. The coating layer made of the third material can be disposed between the coating layer made of the fourth material and the coating layer made of the first material, which is favorable for providing better scratch-resistant and oxidation-resistant effects of the coating layer.

The reflective coating membrane can further include a coating layer made of a fifth material. The fifth material mainly includes metal oxide, and the coating layer made of the fifth material can be disposed between the coating layer made of the first material and the reflective element. Therefore, it is favorable for improving the combination between the coating layer made of the first material and the reflective element.

When a reflectance at a wavelength of 850 nm of the reflective coating membrane is R85, the following condition can be satisfied: 95.0%≤R85. Therefore, the excellent reflectivity of near infrared can be obtained. Moreover, the following conditions can be satisfied: 95.5%≤R85; 96.0%≤R85; 96.5%≤R85; 97.0%≤R85; 97.5%≤R85; 98.0%≤R85; or 98.2%≤R85.

When an average reflectance in a wavelength range of 400 nm-1000 nm of the reflective coating membrane is R40100, the following condition can be satisfied: 95.0%≤R40100. Therefore, the excellent reflectivity of visible light and near infrared can be obtained. Moreover, the following conditions can be satisfied: 95.5%≤R40100; 96.0%≤R40100; 96.5%≤R40100; 97.0%≤R40100; or 98.0%≤R40100.

When a total number of the coating layers of the reflective coating membrane is tLs, the following condition can be satisfied: 4≤tLs. The protective and anti-crack effects can be obtained because of the complete combination of coating layers.

The reflective element can be an element with the function of folding the light path, such as a prism or a mirror. High cost efficiency can be obtained by arranging the reflective coating membrane on the suitable reflective element.

The reflective element can be disposed on an object side or an image side of the optical lens assembly. Therefore, it is favorable for the miniaturization of terminal products by arranging the reflective element at the suitable position.

The reflective element can be disposed between the at least two optical lens elements. Therefore, it is favorable for the miniaturization of terminal products by arranging the reflective element at the suitable position.

The reflective element can be horizontally-movably or rotatably disposed on the image side of the optical lens assembly. Therefore, the focusing and image-stabilizing effects can be achieved by the reflective element.

When an average reflectance in a wavelength range of 380 nm-1050 nm of the reflective coating membrane is R38105, the following conditions can be satisfied: 95.0%≤R38105; 95.5%≤R38105; 96.0%≤R38105; 96.5%≤R38105; or 97.0%≤R38105. Therefore, the excellent reflectivity of visible light and near infrared can be obtained.

When an average reflectance in a wavelength range of 400 nm-500 nm of the reflective coating membrane is R4050, the following conditions can be satisfied: 94.0%≤R4050; 94.5%≤R4050; or 95.0%≤R4050. Therefore, the excellent reflectivity of visible light can be obtained.

When an average reflectance in a wavelength range of 400 nm-600 nm of the reflective coating membrane is R4060, the following conditions can be satisfied: 95.0%≤R4060; 95.5%≤R4060; or 96.0%≤R4060. Therefore, the excellent reflectivity of visible light can be obtained.

When an average reflectance in a wavelength range of 400 nm-700 nm of the reflective coating membrane is R4070, the following conditions can be satisfied: 95.0%≤R4070;

95.5%≤R4070; 96.0%≤R4070; or 96.5%≤R4070. Therefore, the excellent reflectivity of visible light can be obtained.

When an average reflectance in a wavelength range of 650 nm-1050 nm of the reflective coating membrane is R65105, the following conditions can be satisfied: 95.0%≤R65105; 95.5%≤R65105; 96.0%≤R65105; 96.5%≤R65105; 97.0%≤R65105; 97.5%≤R65105; or 98.0%≤R65105. Therefore, the excellent reflectivity of near infrared can be obtained.

When an average reflectance in a wavelength range of 700 nm-1000 nm of the reflective coating membrane is R70100, the following conditions can be satisfied: 95.0%≤R70100; 95.5%≤R70100; 96.0%≤R70100; 96.5%≤R70100; 97.0%≤R70100; 97.5%≤R70100; 98.0%≤R70100; or 98.2%≤R70100. Therefore, the excellent reflectivity of near infrared can be obtained.

When an average reflectance in a wavelength range of 900 nm-1000 nm of the reflective coating membrane is R90100, the following conditions can be satisfied: 95.0%≤R90100; 95.5%≤R90100; 96.0%≤R90100; 96.5%≤R90100; 97.0%≤R90100; 97.5%≤R90100; 98.0%≤R90100; or 98.25%≤R90100. Therefore, the excellent reflectivity of near infrared can be obtained.

When a reflectance at a wavelength of 450 nm of the reflective coating membrane is R45, the following conditions can be satisfied: 94.0%≤R45; 94.5%≤R45; 95.0%≤R45; or 95.5%≤R45. Therefore, the excellent reflectivity of visible light can be obtained.

When a reflectance at a wavelength of 550 nm of the reflective coating membrane is R55, the following conditions can be satisfied: 95.0%≤R55; 95.5%≤R55; 96.0%≤R55; 96.5%≤R55; or 97.0%≤R55. Therefore, the excellent reflectivity of visible light can be obtained.

When a reflectance at a wavelength of 650 nm of the reflective coating membrane is R65, the following conditions can be satisfied: 95.0%≤R65; 95.5%≤R65; 96.0%≤R65; 96.5%≤R65; 97.0%≤R65; or 97.5%≤R65. Therefore, the excellent reflectivity of visible light can be obtained.

When a reflectance at a wavelength of 750 nm of the reflective coating membrane is R75, the following conditions can be satisfied: 95.0%≤R75; 95.5%≤R75; 96.0%≤R75; 96.5%≤R75; 97.0%≤R75; 97.5%≤R75; or 98.0%≤R75. Therefore, the excellent reflectivity of near infrared can be obtained.

When a reflectance at a wavelength of 950 nm of the reflective coating membrane is R95, the following conditions can be satisfied: 95.0%≤R95; 95.5%≤R95; 96.0%≤R95; 96.5%≤R95; 97.0%≤R95; 97.5%≤R95; 98.0%≤R95; or 98.25%≤R95. Therefore, the excellent reflectivity of near infrared can be obtained.

When a reflectance at a wavelength of 1050 nm of the reflective coating membrane is R105, the following conditions can be satisfied: 95.0%≤R105; 95.5%≤R105; 96.0%≤R105; 96.5%≤R105; 97.0%≤R105; 97.5%≤R105; 98.0%≤R105; or 98.2%≤R105. Therefore, the excellent reflectivity of near infrared can be obtained.

When a thickness of the coating layer made of the fourth material is Tsi, the following conditions can be satisfied: 10 nm≤Tsi≤100 nm; 20 nm≤Tsi≤80 nm; or 40 nm≤Tsi≤70 nm. Therefore, the protection can be provided.

When a thickness of the coating layer made of the third material is Tcr, the following conditions can be satisfied: 5 nm≤Tcr≤200 nm; 10 nm≤Tcr≤150 nm; or 30 nm≤Tcr≤100 nm. Therefore, the protection can be provided and the oxidation can be prevented.

When a thickness of the coating layer made of the second material is Tti, the following conditions can be satisfied: 1 nm≤Tti≤50 nm; 10 nm≤Tti≤40 nm; or 20 nm≤Tti≤30 nm. Therefore, the cracks of the coating layer can be prevented.

When a thickness of the coating layer made of the first material is Tag, the following conditions can be satisfied: 50 nm≤Tag≤250 nm; 60 nm≤Tag≤150 nm; or 80 nm≤Tag≤100 nm. Therefore, the reflectivity can be improved.

When a thickness of the coating layer made of the fifth material is Tmo, the following conditions can be satisfied: 0 nm<Tmo≤50 nm; 1 nm≤Tmo≤30 nm; or Tmo≤25 nm. Therefore, the combination between the coating layer and the reflective element can be improved.

When a refractive index of the fourth material is N4, the following condition can be satisfied: N4≤1.6. Therefore, the protection can be provided.

When a refractive index of the third material is N3, the following condition can be satisfied: N3≥2.0. Therefore, the protection can be provided and the oxidation can be prevented.

When a refractive index of the second material is N2, the following condition can be satisfied: N2≥2.0. Therefore, the cracks of the coating layer can be prevented.

When a refractive index of the fifth material is N5, the following condition can be satisfied: 1.6≤N5≤1.7. Therefore, the combination between the coating layer and the reflective element can be improved.

When a refractive index of the reflective element is Ns, the following condition can be satisfied: Ns≤1.7. Therefore, the cost can be effectively controlled.

When a thickness ratio of the coating layer made of the first material to the coating layer made of the fifth material is Tag/Tmo, the following conditions can be satisfied: 1≤Tag/Tmo≤10; 2≤Tag/Tmo≤8; or 3≤Tag/Tmo≤7. Therefore, the combination between the coating layer and the reflective element can be improved, and the high reflectivity can be maintained.

When a thickness ratio of the coating layer made of the first material to the coating layer made of the second material is Tag/Tti, the following conditions can be satisfied: 1≤Tag/Tti≤10; 2≤Tag/Tti≤8; or 3≤Tag/Tti≤7. Therefore, the cracks of the coating layer can be prevented, and the reflectivity can be improved.

When a thickness ratio of the coating layer made of the third material to the coating layer made of the second material is Tcr/Tti, the following conditions can be satisfied: 1≤Tcr/Tti≤10; 1≤Tcr/Tti≤5; or 1≤Tcr/Tti≤3. Therefore, the protection can be provided, and the cracks of the coating layer can be prevented.

When a ratio of a total thickness of the coating layer made of the third material and the coating layer made of the second material to a thickness of the coating layer made of the first material is (Tcr+Tti)/Tag, the following conditions can be satisfied: 0<(Tcr+Tti)/Tag≤1.00; 0.10≤(Tcr+Tti)/Tag≤0.80; or 0.25≤(Tcr+Tti)/Tag≤0.70. Therefore, the protection can be provided, the oxidation and the cracks of the coating layer can be prevented, and the reflectivity can be improved.

When a thickness ratio of the coating layer made of the fourth material to the coating layer made of the third material is Tsi/Tcr, the following conditions can be satisfied: 1≤Tsi/Tcr≤5; 1≤Tsi/Tcr≤3; or 1≤Tsi/Tcr≤2. Therefore, the protection can be provided and the oxidation can be prevented.

According to the optical lens assembly of the present disclosure, a long-wavelength filtering coating membrane can be disposed on a surface of the optical lens element. The long-wavelength filtering coating membrane is manufactured by depositing a plurality of thin films on a surface of a plastic material. Physical vapor deposition can be adopted, such as evaporative deposition or sputtering deposition, or chemical vapor deposition can be adopted, such as ultra-high vacuum chemical vapor deposition, microwave plasma-enhanced chemical vapor deposition or plasma-enhanced chemical vapor deposition.

According to the optical lens assembly of the present disclosure, an absorbing material can be added into the optical lens element, and higher uniformity of absorption thereof and similar color uniformity of every field can be achieved. The optical lens element of the optical lens assembly can include a long-wavelength absorbing material. The long-wavelength absorbing material is mixed with the plastic material of the optical lens element and evenly distributed therein. The long-wavelength absorbing material must be able to withstand the high temperature during the injection molding process without pyrolysis, so as to maintain the proper long-wavelength absorbing effect. The optical lens element can further include a short-wavelength absorbing material. The short-wavelength absorbing material is mixed with the plastic material of the optical lens element and evenly distributed therein. The short-wavelength absorbing material must be able to withstand the high temperature during the injection molding process without pyrolysis, so as to maintain the proper short-wavelength absorbing effect. The long wavelength region defined in the present disclosure is the region having a wavelength above 500 nm, and the short wavelength region is the region having a wavelength below 500 nm.

The reflectance of the present disclosure is mainly the data of a single reflective element. If the reflective coating membranes are arranged on a plurality of reflective elements or on a plurality of surfaces, the reflectance can be the comprehensive data of the plurality of reflective elements or the plurality of surfaces.

High temperature will make the error of the surface shape change of the plastic optical lens element become too large. When the number of coating layers of the reflective coating membrane increases, the effect of temperature on the surface shape accuracy is more obvious. The lens correcting technology can effectively solve the temperature effect problem as coating the plastic surface of the optical lens element, which is favorable for maintaining the integrity of coating on the optical lens element and the high precision of the plastic optical lens element, so as to obtain the optical lens assembly with high quality.

The lens correcting technology uses methods such as moldflow analysis method, curve fitting function method or wavefront aberration method, which is not limited thereto. The moldflow analysis method uses moldflow analysis to find out the three-dimensional contour nodes of the surface of the optical lens element which contracts on the Z axis. The three-dimensional contour nodes are converted into an aspherical curve to be compared with the original curve. At the same time, the correction value is calculated by considering the shrinkage rate of the material of the optical lens element and the deformation trend of surface shape. The curve fitting function method is to measure the contour deviation of the surface of the optical lens element, and the fitting curve approaches to the measuring point to obtain the correction value by curve-fitting with a function and then by an optimization algorithm. The function can be exponential or polynomial, and the optimization algorithm can be Gauss Newton algorithm, simplex algorithm or steepest descent method. The wavefront aberration method is to measure the wavefront aberration (imaging aberration) data of the optical lens assembly with an interferometer. The wavefront aberration generated during manufacturing and assembling is comprehensively analyzed with the wavefront aberration of the original design value, and the correction value is obtained after optimized with optical software.

Figure 3A:
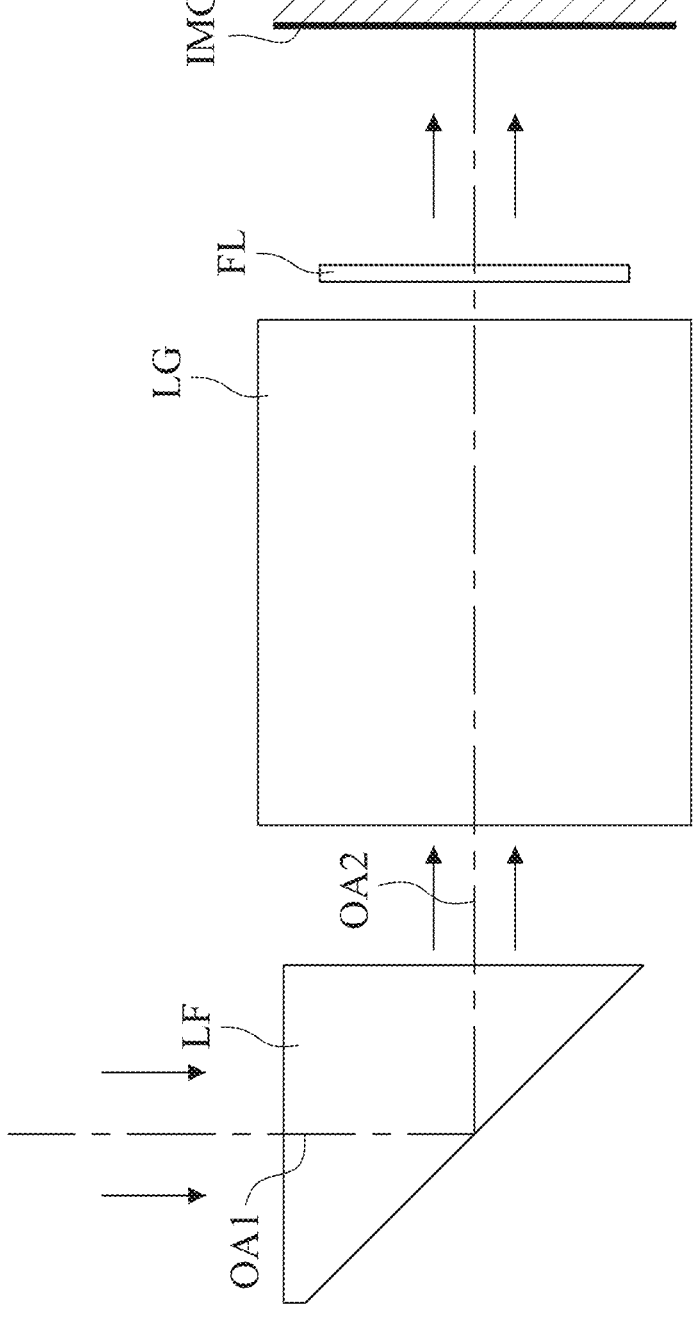
FIG. 3A is a schematic view of an arrangement of a light path folding element in the optical lens assembly of the present disclosure.
Figure 3B:
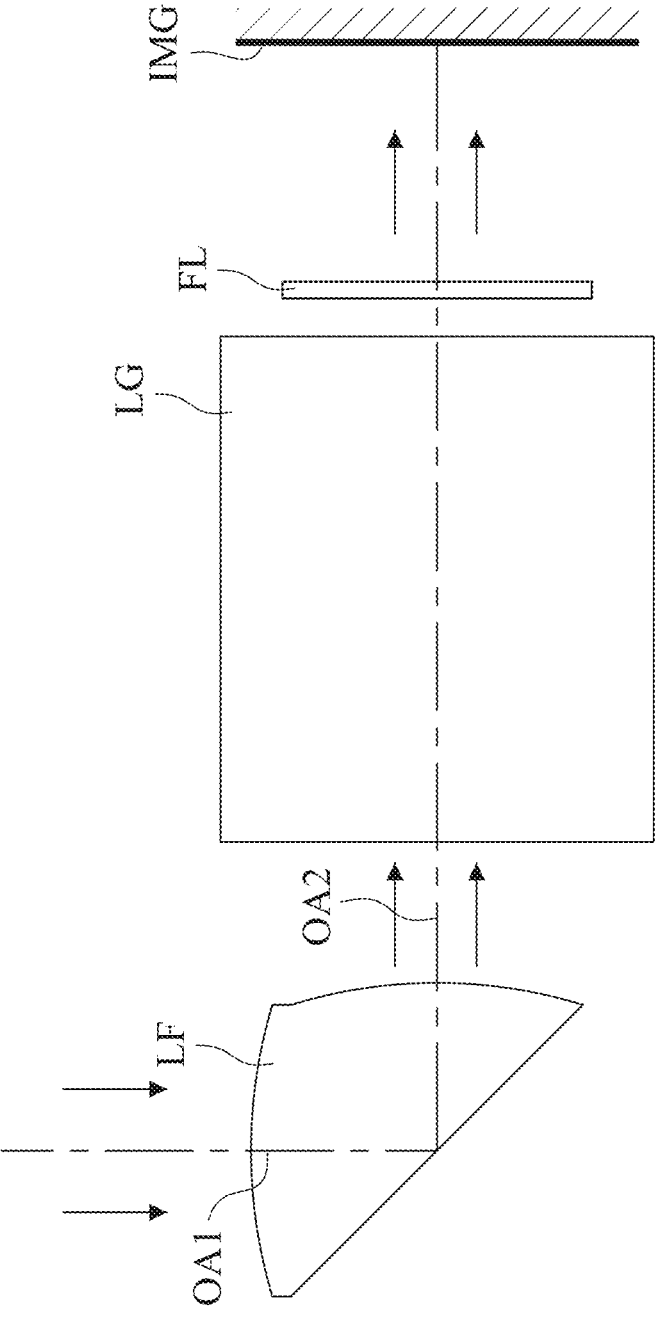
FIG. 3B is a schematic view of another arrangement of the light path folding element in the optical lens assembly of the present disclosure.
Figure 3C:
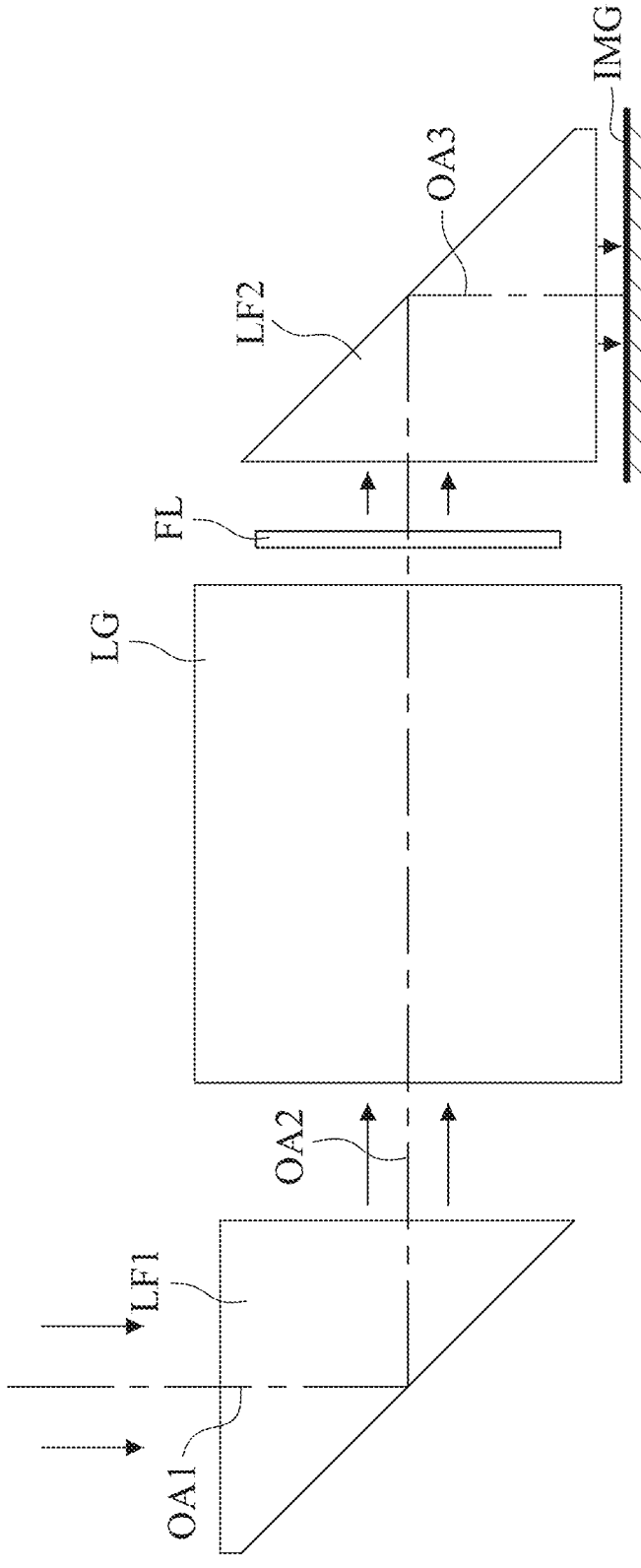
FIG. 3C is a schematic view of an arrangement of two light path folding elements in the optical lens assembly of the present disclosure.
Figure 3D:
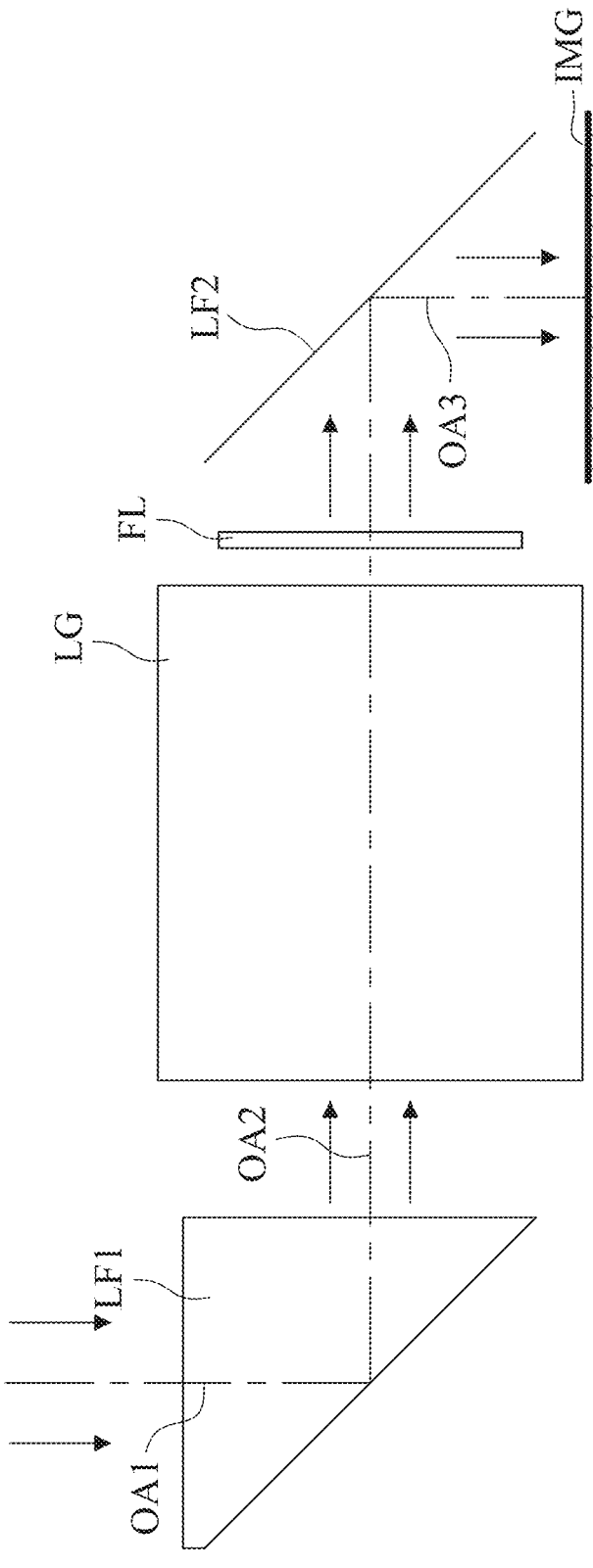
FIG. 3D is a schematic view of another arrangement of the two light path folding elements in the optical lens assembly of the present disclosure.
Figure 3E:
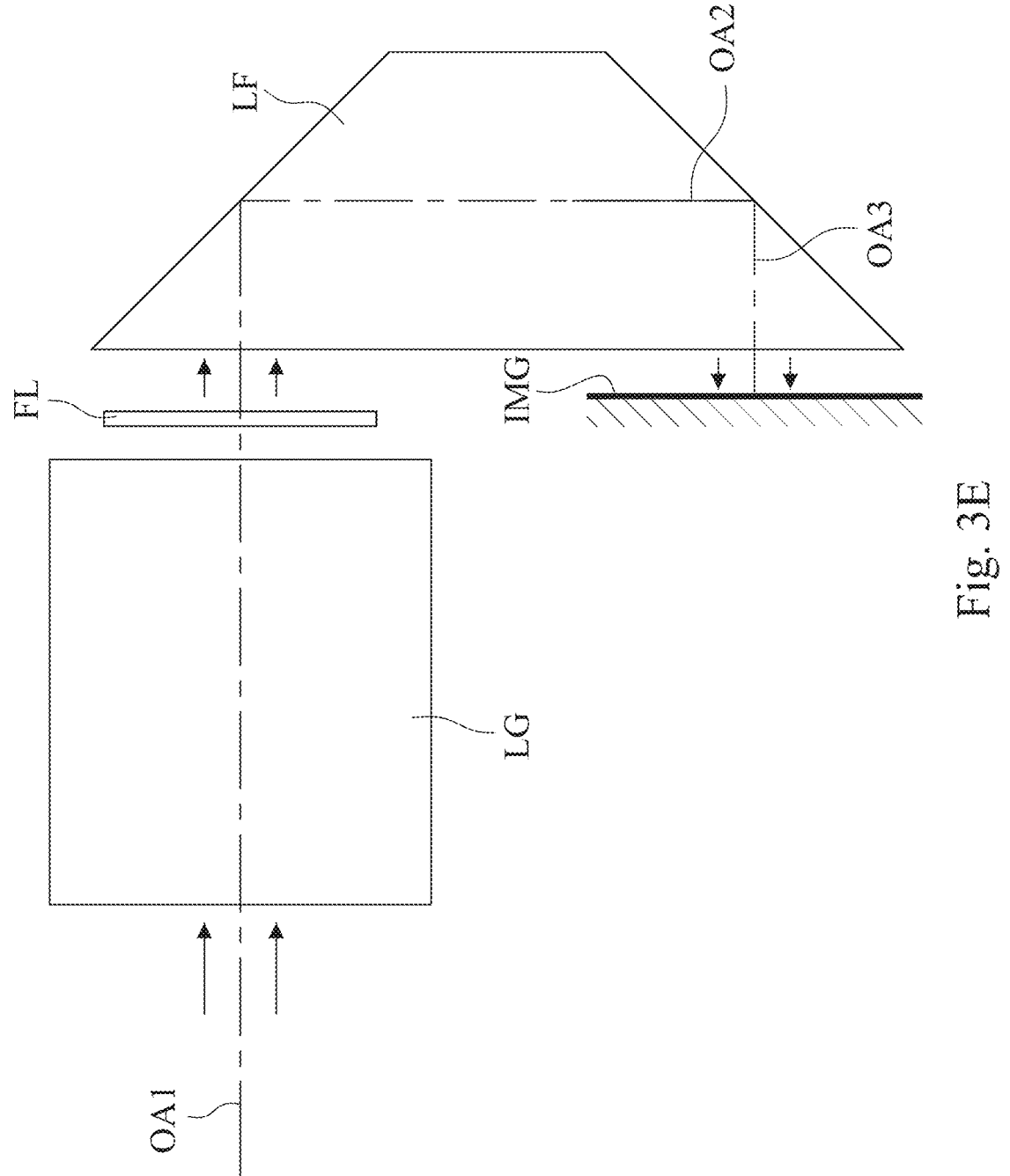
FIG. 3E is a schematic view of one another arrangement of the light path folding element in the optical lens assembly of the present disclosure.

According to the optical lens assembly of the present disclosure, at least one element with light path folding function can be selectively disposed between the imaged object and the image surface, such as a prism or a mirror. Therefore, it is favorable for providing high flexible space arrangement of the optical lens assembly, so that the compactness of the electronic device would not be restricted by the optical total track length of the optical lens assembly. Furthermore, FIG. 3A is a schematic view of an arrangement of a light path folding element LF in the optical lens assembly of the present disclosure. FIG. 3B is a schematic view of another arrangement of the light path folding element LF in the optical lens assembly of the present disclosure. As shown in FIG. 3A and FIG. 3B, the optical lens assembly includes, in order from an imaged object (not shown in drawings) to an image surface IMG, a first optical axis OA1, the light path folding element LF, a second optical axis OA2 and a filtering element FL, wherein the light path folding element LF is disposed between the imaged object and a lens group LG of the optical lens assembly, and the surfaces of the light path folding element LF where the light strikes on or transmits through can be planar as shown in FIG. 3A, or be curved as shown in FIG. 3B. Moreover, FIG. 3C is a schematic view of an arrangement of two light path folding elements LF1, LF2 in the optical lens assembly of the present disclosure. FIG. 3D is a schematic view of another arrangement of the two light path folding elements LF1, LF2 in the optical lens assembly of the present disclosure. As shown in FIG. 3C and FIG. 3D, the optical lens assembly includes, in order from an imaged object (not shown in drawings) to an image surface IMG, a first optical axis OA1, the light path folding element LF1, a second optical axis OA2, a filtering element FL, the light path folding element LF2 and a third optical axis OA3, wherein the light path folding element LF1 is disposed between the imaged object and a lens group LG of the optical lens assembly, and the light path folding element LF2 is disposed between the lens group LG of the optical lens assembly and the image surface IMG. The light path folding element LF2 can be a prism as shown in FIG. 3C, or be a mirror as shown in FIG. 3D. Moreover, FIG. 3E is a schematic view of one another arrangement of the light path folding element LF in the optical lens assembly of the present disclosure. As shown in FIG. 3E, the optical lens assembly includes, in order from an imaged object (not shown in drawings) to an image surface IMG, a first optical axis OA1, a filtering element FL, the light path folding element LF, a second optical axis OA2 and a third optical axis OA3, wherein the light path folding element LF is disposed between a lens group LG of the optical lens assembly and the image surface IMG, and the light path can be folded twice in the light path folding element LF as shown in FIG. 3E. The optical lens assembly can selectively include three or more light path folding elements, and the type, number and position of the light path folding element are not limited to the drawings according to the present disclosure.

According to another aspect of the present disclosure, an imaging apparatus includes the optical lens assembly of the aforementioned aspect and an image sensor. The image sensor is disposed on an image surface of the optical lens assembly.

According to one another aspect of the present disclosure, an electronic device, which is a mobile device, includes the imaging apparatus of the aforementioned aspect.

According to still another aspect of the present disclosure, an electronic device is provided, wherein the electronic device includes the imaging apparatus of the aforementioned aspect. Therefore, it is favorable for enhancing the image quality. Preferably, the electronic device can further include, but not limited to, a control unit, a display unit, a storage unit, a random access memory unit (RAM) or a combination thereof.

According to the present disclosure, the optical lens assembly can be utilized in 3D (three-dimensional) image capturing applications, in products such as digital cameras, mobile devices, digital tablets, smart TVs, surveillance systems, motion sensing input devices, driving recording systems, rearview camera systems, wearable devices, or unmanned aerial vehicles.

According to the present disclosure, the imaging apparatus is a camera module, the imaging apparatus includes an imaging lens, a driving apparatus and the image sensor, wherein the imaging lens includes the optical lens assembly of the present disclosure and a lens barrel for carrying the optical lens assembly. The imaging apparatus can enable light converging from an imaged object via the imaging lens, perform image focusing by the driving apparatus, and generate an image on the image sensor, and the imaging information can be transmitted.

According to the present disclosure, the imaging apparatus can be a wide-angle imaging apparatus, a super wide-angle imaging apparatus, a telephoto imaging apparatus (including light path folding element) or a TOF module (time-of-flight module). However, the present disclosure is not limited thereto. Moreover, the connection between the imaging apparatus and other elements can be modified according to the type of the imaging apparatus, which will not be described again herein.

According to the present disclosure, the driving apparatus can be an auto-focus module, which can be driven by driving systems, such as voice coil motors (VCM), micro electro-mechanical systems (MEMS), piezoelectric systems, and shape memory alloys. The optical lens assembly can obtain a favorable imaging position by the driving apparatus so as to capture clear images when the imaged object is disposed at different object distances.

According to the present disclosure, the imaging apparatus can include the image sensor located on the image surface of the optical lens assembly, such as CMOS and CCD, with superior photosensitivity and low noise. Thus, it is favorable for providing realistic images with high definition image quality thereof. Furthermore, the imaging apparatus can further include an image stabilization module, which can be a kinetic energy sensor, such as an accelerometer, a gyro sensor, or a Hall Effect sensor, but is not limited thereto. Therefore, the variation of different axial directions of the optical lens assembly can be adjusted so as to correct the image blur generated by motion at the moment of exposure, and it is further favorable for enhancing the image quality while photographing in motion and low light situation. Furthermore, advanced image correcting functions, such as optical image stabilizations (OIS) and electronic image stabilizations (EIS), can be provided.

According to the present disclosure, the electronic device is a smartphone, wherein the electronic device includes the imaging apparatus, a flash module, a focusing assisting module, an image signal processor (ISP), a user interface and an image software processor. The imaging apparatus can be a front camera or a rear camera. When a user captures images of the imaged object through the user interface, the light rays converge in the imaging apparatus to generate an image(s), and the flash module is activated for light supplement. The focusing assisting module detects the object distance of the imaged object to achieve fast auto focusing. The image signal processor and the image software processor are configured to optimize the captured image to improve image quality. The light beam emitted from the focusing assisting module can be either conventional infrared or laser. The user interface can be a touch screen or a physical button. The user is able to interact with the user interface and image processing software having multiple functions to capture images and complete image processing.

According to the present disclosure, the image can be captured by the imaging apparatus through a non-circular opening corresponding to the outer side of the electronic device.

According to the above description of the present disclosure, the following specific embodiment is provided for further explanation.

1st Embodiment

The optical lens assembly of the 1st embodiment includes two optical lens elements and a reflective element, which are, in order from an object side to an image side along an optical path, a first optical lens element, a second optical lens element and the reflective element. Each of the two optical lens elements has an object-side surface towards the object side and an image-side surface towards the image side. The reflective element is made of a plastic material and includes a reflective coating membrane, and the reflective coating membrane is disposed on a surface of the reflective element. In the 1st embodiment, the reflective coating membrane includes five coating layers. The five coating layers, in order from a side adjacent to the air to a side adjacent to the reflective element, are made of a fourth material, a third material, a second material, a first material and a fifth material, respectively. The fourth material is silicon dioxide ($SiO_2$), the third material is chromium oxide ($CrO_x$), the second material is titanium (Ti), the first material is silver (Ag), and the fifth material is metal oxide.

The reflective coating membrane of the comparative embodiment includes four coating layers. The four coating layers, in order from a side adjacent to the air to a side adjacent to the reflective element, are made of silicon dioxide, chromium oxide, chromium (Cr) and silver, respectively.

The specific arrangements of the reflective coating membranes according to the 1st embodiment and the comparative embodiment are listed in Table 1 below.

TABLE 1

| Comparative Embodiment | | 1st Embodiment | | | |
|---|---|---|---|---|---|
| Layer No. | Material | Layer No. | Material | Refractive Index | Thickness (nm) |
| | Air | | Air | 1.00 | — |
| 1 | $SiO_2$ | 1 | $SiO_2$ | 1.46 | 65 |
| 2 | $CrO_x$ | 2 | $CrO_x$ | 2.53 | 35 |
| 3 | Cr | 3 | Ti | 2.37 | 20 |
| 4 | Ag | 4 | Ag | — | 100 |
| 5 | — | 5 | Metal Oxide | 1.67 | 20 |
| Substrate | Plastic | Substrate | Plastic | 1.65 | — |

Furthermore, the properties, such as refractive index and thickness, of each coating layer of the reflective coating membrane according to the 1st embodiment are listed in Table 2 below.

TABLE 2

| | |
|---|---|
| N4 | 1.46 |
| N3 | 2.53 |
| N2 | 2.37 |
| N5 | 1.67 |
| Ns | 1.65 |
| Tsi (nm) | 65 |
| Tcr (nm) | 35 |
| Tti (nm) | 20 |
| Tag (nm) | 100 |
| Tmo (nm) | 20 |
| Tag/Tmo | 5.00 |
| Tag/Tti | 5.00 |
| Tcr/Tti | 1.75 |
| (Tcr + Tti)/Tag | 0.55 |
| Tsi/Tcr | 1.86 |

Figure 1B:
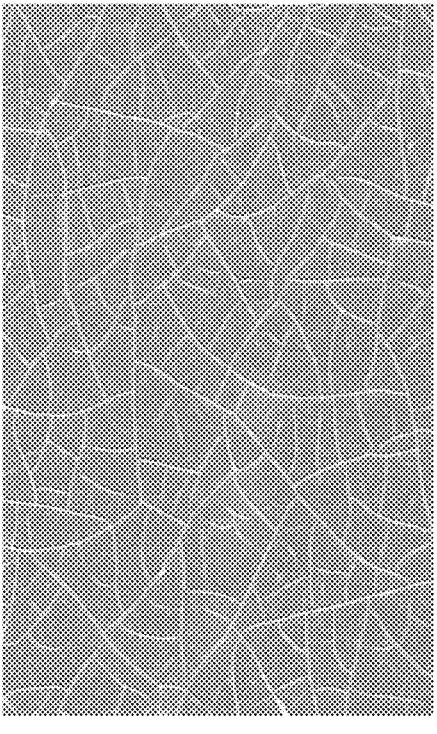
FIG. 1B is a surface quality image of the reflective element of the 1st embodiment.

FIG. 1A is a surface quality image of the reflective element of the comparative embodiment. FIG. 1B is a surface quality image of the reflective element of the 1st embodiment. In FIG. 1A and FIG. 1B, there are cracks on the surface of the reflective element of the comparative embodiment, and the surface of the reflective element of the 1st embodiment is intact and without any crack due to the suitable arrangement of the coating layers of different materials.

Figure 2:
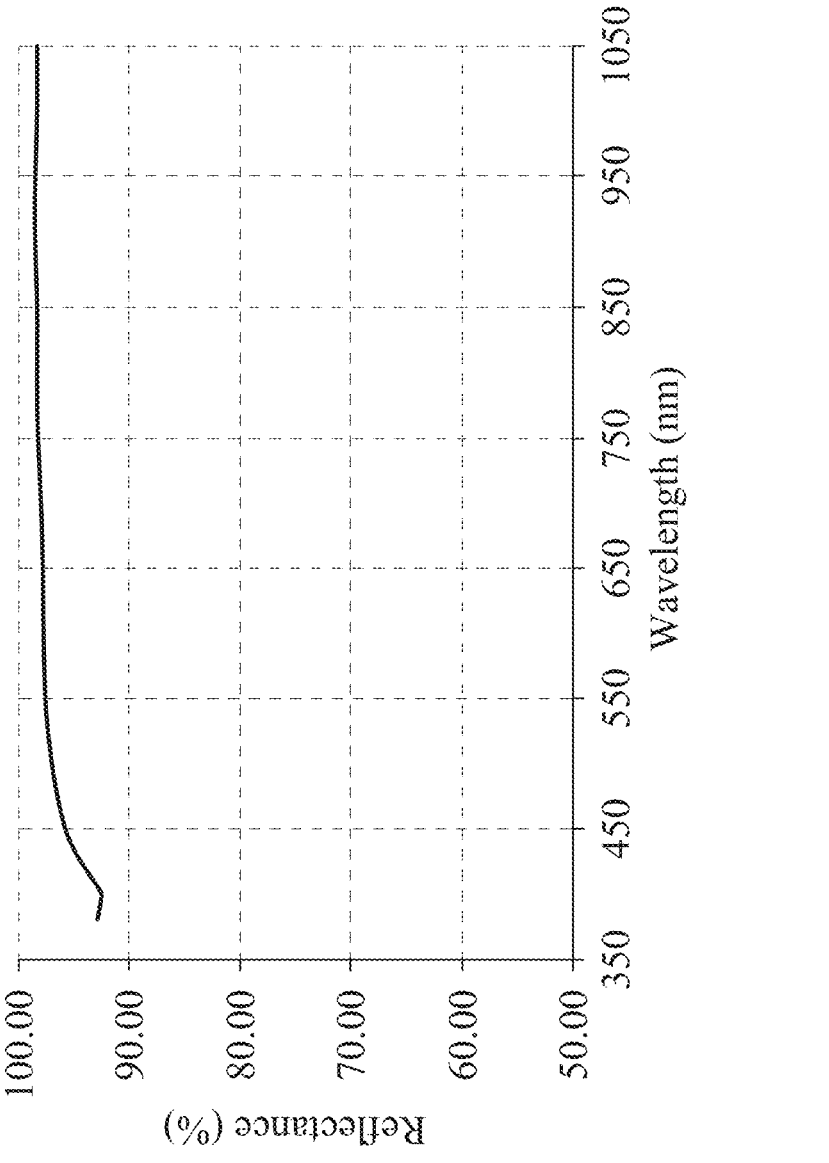
FIG. 2 is a relationship diagram of reflectance and wavelength of the reflective element according to the 1st embodiment.

FIG. 2 is a relationship diagram of reflectance and wavelength of the reflective element according to the 1st embodiment. The results of reflectance at different wavelengths of the reflective element of the 1st embodiment are listed in Table 3 below.

TABLE 3

| | | | |
|---|---|---|---|
| R38105 (%) | 97.42 | R45 (%) | 95.75 |
| R4050 (%) | 95.31 | R55 (%) | 97.33 |
| R4060 (%) | 96.31 | R65 (%) | 97.72 |
| R4070 (%) | 96.79 | R75 (%) | 98.13 |
| R40100 (%) | 97.51 | R85 (%) | 98.22 |
| R65105 (%) | 98.18 | R95 (%) | 98.42 |
| R70100 (%) | 98.23 | R105 (%) | 98.24 |
| R80100 (%) | 98.30 | | |
| R90100 (%) | 98.36 | | |

As shown in Table 3, in the visible light region and the near infrared region, the light with different wavelengths can be effectively reflected by the reflective element of the 1st embodiment. The reflectivity of the reflective element of the 1st embodiment is excellent, which is favorable for preventing the reflective coating membrane on the reflective element from cracking.

According to the present disclosure, the optical lens assembly can include three optical lens elements and a reflective element, four optical lens elements and a reflective element, five optical lens elements and a reflective element, six optical lens elements and a reflective element, seven optical lens elements and a reflective element, eight optical lens elements and a reflective element, nine optical lens elements and a reflective element, ten optical lens elements and a reflective element, and so on. The optical lens assembly can include three optical lens elements and two reflective elements, four optical lens elements and two reflective elements, five optical lens elements and two reflective elements, six optical lens elements and two reflective elements, seven optical lens elements and two reflective elements, eight optical lens elements and two reflective elements, nine optical lens elements and two reflective elements, ten optical lens elements and two reflective elements, and so on. The optical lens assembly can include three optical lens elements and three reflective elements, four optical lens elements and three reflective elements, five optical lens elements and three reflective elements, six optical lens elements and three reflective elements, seven optical lens elements and three reflective elements, eight optical lens elements and three reflective elements, nine optical lens elements and three reflective elements, ten optical lens elements and three reflective elements, and so on.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, comprising:
at least two optical lens elements; and
at least one reflective element;
wherein the reflective element is made of a plastic material, the reflective element comprises a reflective coating membrane, and the reflective coating membrane is disposed on a surface of the reflective element;
wherein the reflective coating membrane comprises at least three coating layers of different materials, the at least three coating layers are respectively made of a first material, a second material and a third material, the first material mainly comprises silver, the second material mainly comprises titanium, the third material mainly comprises chromium oxides, and the coating layer made of the first material and the coating layer made of the second material are disposed between the coating layer made of the third material and the reflective element;
wherein an average reflectance in a wavelength range of 800 nm-1000 nm of the reflective coating membrane is R80100, and the following condition is satisfied:

97.5%≤R80100;

wherein the coating layer made of the second material is disposed between the coating layer made of the third material and the coating layer made of the first material;

wherein a thickness of the coating layer made of the third material is Tcr, and the following conditions is satisfied:

5 nm≤Tcr≤200 nm.

2. The optical lens assembly of claim 1, wherein the reflective coating membrane further comprises a coating layer made of a fourth material, the fourth material mainly comprises silicon compound.

3. The optical lens assembly of claim 2, wherein the coating layer made of the third material is disposed between the coating layer made of the fourth material and the coating layer made of the first material.

4. The optical lens assembly of claim 3, wherein the reflective coating membrane further comprises a coating layer made of a fifth material, the fifth material mainly comprises metal oxide, and the coating layer made of the fifth material is disposed between the coating layer made of the first material and the reflective element.

5. The optical lens assembly of claim 4, wherein a reflectance at a wavelength of 850 nm of the reflective coating membrane is R85, and the following condition is satisfied:

98.0%≤R85.

6. The optical lens assembly of claim 3, wherein an average reflectance in a wavelength range of 400 nm-1000 nm of the reflective coating membrane is R40100, and the following condition is satisfied:

98.0%≤R40100.

7. The optical lens assembly of claim 6, wherein a total number of the coating layers of the reflective coating membrane is tLs, and the following condition is satisfied:

4≤tLs.

8. The optical lens assembly of claim 7, wherein the reflective element is a prism or a mirror.

9. The optical lens assembly of claim 1, wherein the reflective element is disposed on an object side or an image side of the optical lens assembly.

10. The optical lens assembly of claim 1, wherein the reflective element is disposed between the at least two optical lens elements.

11. The optical lens assembly of claim 1, wherein the reflective element is horizontally-movably or rotatably disposed on an image side of the optical lens assembly.

12. An imaging apparatus, comprising:
the optical lens assembly of claim 1; and
an image sensor disposed on an image surface of the optical lens assembly.

13. An electronic device, which is a mobile device, and the electronic device comprising:
the imaging apparatus of claim 12.

* * * * *